(12) United States Patent
Yaari et al.

(10) Patent No.: US 7,530,056 B1
(45) Date of Patent: May 5, 2009

(54) METHOD AND SYSTEM FOR DETECTING RUNTIME DEFECTS IN A PROGRAM BY COMPARING CORRECT AND INCORRECT RUNS

(75) Inventors: Yaakov Yaari, Haifa (IL); Andre Heilper, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/060,238

(22) Filed: Mar. 31, 2008

(51) Int. Cl.
G06F 9/44 (2006.01)
(52) U.S. Cl. ...................................... 717/128; 717/129
(58) Field of Classification Search ................ 717/128, 717/129
See application file for complete search history.

(56) References Cited

U.S. PATENT DOCUMENTS

| | | | |
|---|---|---|---|
| 4,864,569 A | 9/1989 | DeLucia et al. |
| 5,175,856 A | 12/1992 | Van Dyke et al. |
| 5,335,342 A | 8/1994 | Pope et al. |
| 6,173,440 B1 | 1/2001 | Darty |
| 6,434,741 B1 | 8/2002 | Mirani et al. |
| 6,490,696 B1 | 12/2002 | Wood et al. |
| 6,526,567 B1 | 2/2003 | Cobbett et al. |
| 7,174,536 B1 | 2/2007 | Kothari et al. |
| 7,296,261 B2 | 11/2007 | Witchel et al. |
| 2002/0080181 A1 | 6/2002 | Razdow et al. |
| 2003/0061600 A1 | 3/2003 | Bates et al. |
| 2005/0071813 A1 | 3/2005 | Reimer et al. |
| 2006/0005182 A1 | 1/2006 | Butterweck et al. |
| 2006/0070048 A1 | 3/2006 | Li et al. |
| 2006/0085132 A1 | 4/2006 | Sharma et al. |
| 2006/0184838 A1 | 8/2006 | Singanohalli et al. |
| 2006/0190930 A1 | 8/2006 | Hecht et al. |
| 2007/0168975 A1 | 7/2007 | Kessler |
| 2007/0168992 A1 | 7/2007 | Bates |
| 2007/0198971 A1 | 8/2007 | Dasu et al. |

OTHER PUBLICATIONS

Abramson et al., "Relative Debugging Using Multiple Program Versions," Retrieved on Mar. 24, 2008 from the internet: http://citeseer.ist.psu.edu/cache/papers/cs/763/http:zSzzSzwww.rdt.monash.edu.auzSz~davidazSzpaperszSzislip.pdf/relative-debugging-using-multiple.pdf.

Abramson et al., "A Debugging Tool for Software Evolution," Case-95, 7th International Workshop on Computer-Aided Software Engineering, Toronto, Ontario, Canada, Jul. 1995.

Abramson et al., "Parallel Relative Debugging with Dynamic Data Structures," 16th International Conference on Parallel and Distributed Computing Systems, pp. 22-29, Aug. 13-15, 2003 Reno, Nevada, USA.

*Primary Examiner*—Eric B Kiss
(74) *Attorney, Agent, or Firm*—Connolly Bove Lodge & Hutz LLP; Robert M. Trepp

(57) ABSTRACT

The invention provides an improved method and method for locating the origin of runtime defect in software programs. A differential debugging technique may be implemented to locate the diversion point where two programs start to behave differently. In one approach, the method generally involves running the two programs and generating respective control flow diagrams via a static code analyzer or the like. Tracer and supervisor modules may be used to replace addresses in registers with symbols and/or position-independent offsets, and to locate where differences in the register states occur.

2 Claims, 2 Drawing Sheets

METHOD AND SYSTEM FOR DETECTING RUNTIME DEFECTS IN A PROGRAM BY COMPARING CORRECT AND INCORRECT RUNS

BACKGROUND OF THE INVENTION

1. Field of the Invention

The present invention is directed toward software testing, and more particularly to methods and systems for locating the point of failure in a program.

2. Description of the Related Art

Software may be continually revised and updated during development. When a modified version of a software program runs incorrectly, it may be very difficult to locate where something went wrong in the modified version. Such modifications may include: (1) the program is being optimized by a binary level (or post-link) optimization tool; (2) the program is run on a different platform (e.g., a new hardware or operating system); and (3) the program is recompiled by a new compiler or with a different optimization scheme.

The incorrect behavior may appear in a number of ways, such as, for example, aborting at some point in the execution, or producing incorrect results. One current approach for locating runtime defects involves breaking as close to where the failure is and then carefully comb the code for the improper code. This approach is tedious and time consuming. Moreover, if symbolic information is not available, or if the incorrect behavior is the final result, it becomes even more difficult to locate the point of diversion between the two programs.

Another current approach is to use a graphical user interface (GUI) to parallel debug both correct and incorrect programs, wherein a user selects and sets breakpoints at the same symbolic location in both programs and defines the state data. This approach is described in further detail in Abramson et al. in "Parallel Relative Debugging with Dynamic Data Structures," 16th International Conference on Parallel and Distributed Computing Systems, pp 22-29, Aug. 13-15, 2003 Reno, Nev., USA. However, this approach requires symbolic information and does not work when none is available. In addition, it requires human control to select the breakpoint and the state data.

Another current approach involves creating a text trace of code in the neighborhood of the problem, containing machine state (e.g., register) changes, for both the correct and in correct programs. This approach does not work unless the location of the failure is known, which is not the case when we have incorrect results. It also does not work if the failure (i.e., diversion) starts much earlier before the external termination failure occurs.

Accordingly, there is a need for an automated technique that, given two programs and a given workload, will pinpoint the specific place where the incorrect program starts differing from the correct one (i.e., the program state has diverged from that of the correct program). For practical purposes, the program state may comprise a subset of the machine registers and/or selected program variables.

SUMMARY OF THE INVENTION

The present invention addresses the shortcomings of the prior art methods and systems. In particular, the present invention is directed toward methods and systems for differentially debugging two programs (e.g., an updated version of a program and an original version of the program) iteratively and automatically.

In accordance with one aspect of the embodiments described herein, there is a method and system for locating where a runtime defect occurs in an updated version of program. The method may involve: generating a first CFG for an original program, the original program being a predecessor version of the updated program and being free of the runtime defect; and generating a second CFG for the updated program, the first and second CFGs each comprising a plurality of nodes defining a respective tree structure.

The method may also involve: selecting corresponding first and second paths traversing through nodes at a selected hierarchy level of the first and second CFGs, respectively, and tracing the first and second paths. Tracing the paths may also involve: running the original and updated programs on a computing device comprising a memory register; breaking after each traversed node; and determining register states before and after each call to the given traversed node.

The method may also involve comparing the register states for the first and second paths. A difference in the register states may indicate that the runtime defect has occurred. Comparing the register states may involve, when at least one of the original and updated programs includes debug information provided by a compiler and a given register contains an address of a variable, replacing the address with a corresponding name of the variable.

In the alternative, or in addition, comparing register states may involve, when the at least one of the original and updated programs includes a symbol table that maps variable names to addresses and the given register contains a value in the symbol table, replacing the value with the corresponding name. In another alternative, or in addition, comparing register states may involve, when the at least one of the original and updated programs does not include the debug information or the symbol table and the given register holds a data address, replacing the data address by an offset from the beginning of the data section.

The method may also involve selecting corresponding first and second paths traversing through nodes at a next selected hierarchy level of the first and second CFGs, respectively, the next selected hierarchy level being lower any preceding selected hierarchy levels. The above-described steps may be repeated until a predefined condition is met, such as, for example, when the difference in the memory register states for the first and second paths occurs.

DETAILED DESCRIPTION

The present invention addresses the need for a method and system for finding the diversion point where two programs start to behave differently. For example, when comparing a good program vs. a bad program (i.e., one known to have at least one runtime defect), the diversion point may be the point of failure of the bad program. Once the point of failure is located, the user or programmer can fix the problem.

Figure 1:
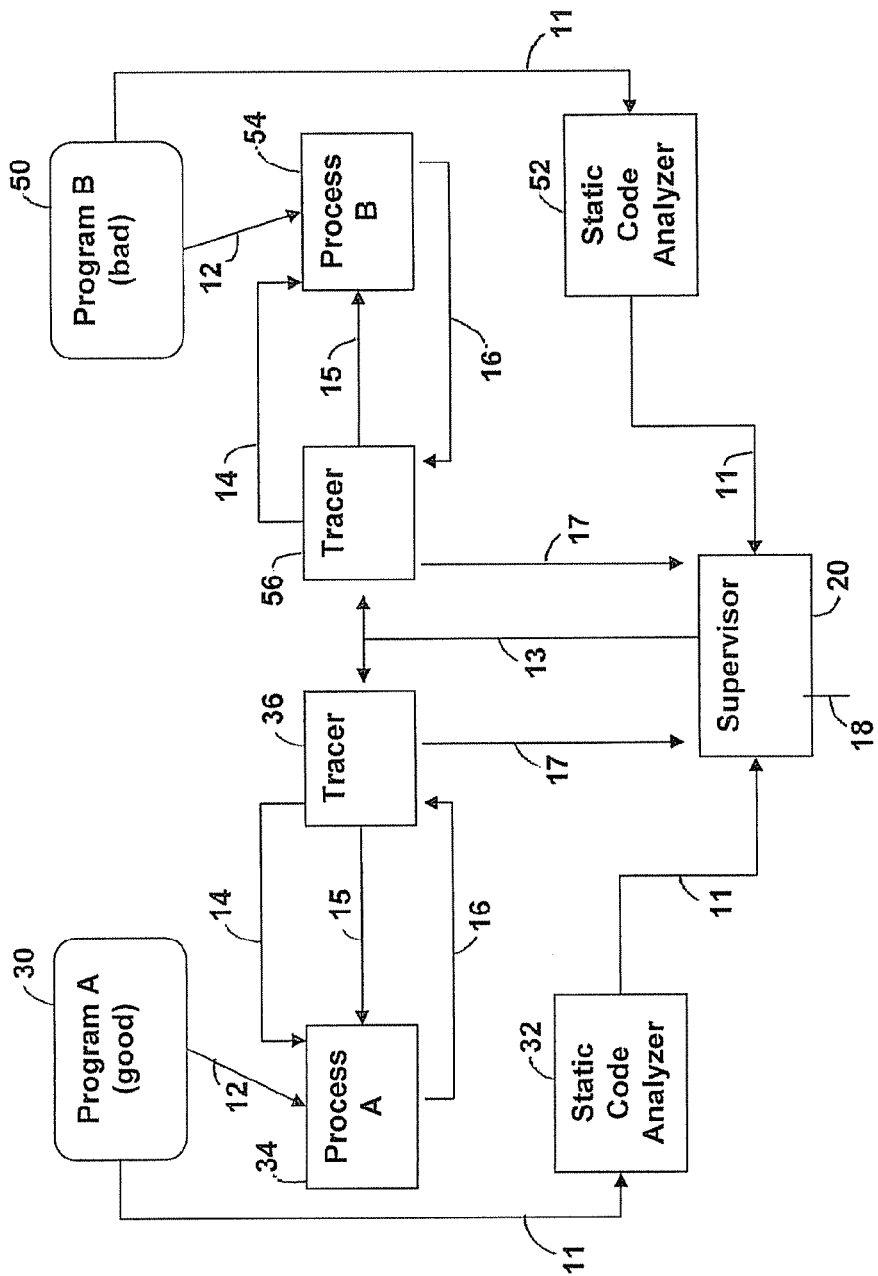
FIG. 1 is a block diagram of an exemplary differential debugger.

With reference to FIG. 1, there is provided an exemplary differential debugger (DD) system 10 for determining the point of diversion between program 30 (a good program) and program 50 (a bad program). Programs 30 and 50 to be compared are run, creating respectively two processes. Their execution may be closely controlled by respective tracer processes. The comparison process may be supervised by the supervisor module 20, which utilizes control flow diagrams or graphs of programs 30, 50 produced by the respective static code analyzers 32, 52. The static code analyzers 32, 52 may comprise any suitable program that performs static analysis and produces a control flow graph (CFG). Steps 11-18 for testing and comparing programs 30 and 50 are described in further detail below.

At step 11, programs 30 and 50 may be analyzed statically by the static analyzers 32 and 52, respectively, and the respective resulting CFGs may be fed to the supervisor module 20. The supervisor module 20 may determine whether the CFGs are similar enough so that comparison is possible. If not, the supervisor 20 may exit; otherwise, it may take the function at the root of the CFG, and make it the currently investigated function (CIF).

Figure 2:
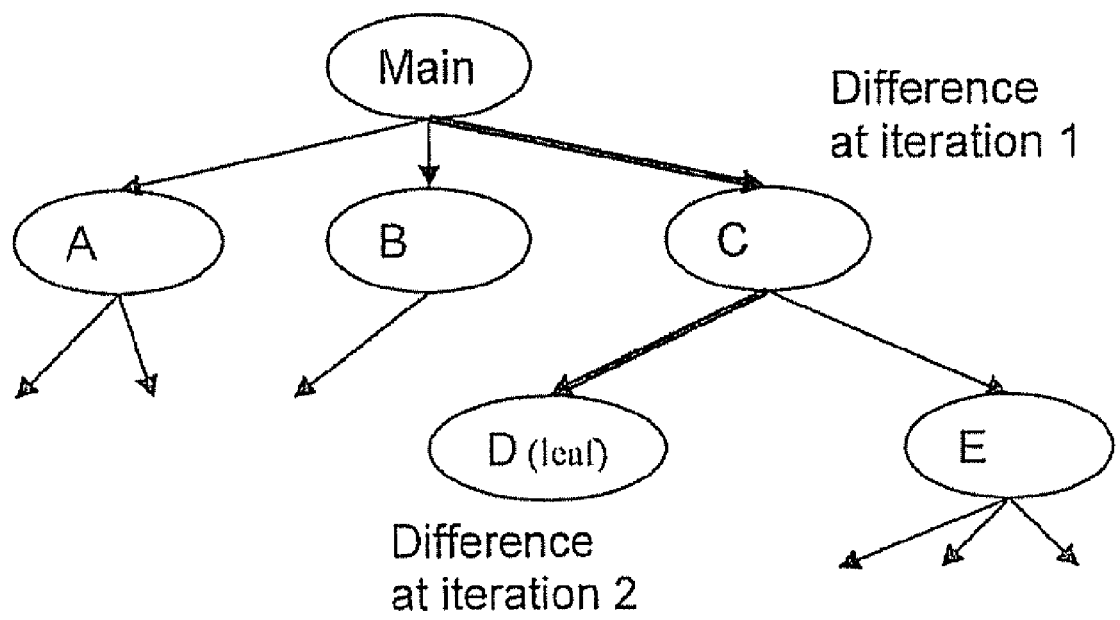
FIG. 2 illustrates an exemplary currently investigation function (CIF).

At step 12 (executable file), tracers 36 and 56 load programs 30 and 50, respectively, and get them ready for execution. At step 13 (break list), the supervisor module 20 may determine from the CFG the breakpoint list needed to locate the diversion point. In one exemplary scenario, a given CIF may call certain functions, such as functions A, B, and C (see FIG. 2). The supervisor 20 may determine the location of their return to the CIF, as well as all the return points from CIF. These points, which are inside CIF, may include the new breakpoint list. The list for processes 34 and 54 may be different since the respective code may be structured differently, even though functionally equivalent.

In another exemplary scenario, a given CIF may not call functions. This may be referred as a leaf function (in CFG terms). This may start the last iteration of the comparison process. The breakpoint list may include the address of all instructions, which effectively means single-stepping through the CIF. Each list may be sent to its corresponding tracer process 34, 54.

At step 14 (breakpoint setup), the tracers 36, 56 may insert break points into their respective processes 34, 54. The tracers 36, 56 may insert such break points at addresses given to them by the supervisor module 20 at step 13. At step 15 (execution control), the tracer processes 34, 54 may wait for a breakpoint to occur and then check to see whether their attached processes reached to one of their exit points. If so, the tracer processes 34, 54 may send an end-of-message indication to the supervisor module 20, or else issue continue command to their attached process.

At step 16 (state packet), the two processes 34, 54 may continue until a break, an exception, or a CIF return occurs, then may return control to the respective tracer processes 34, 54. The tracer processes 34, 54 may request a state packet including the "delta" of the user-visible registers and may send this back to the supervisor process. The term "delta" used herein refers to the registers that changed since the last transmission. Step 15 may then be resumed.

At step 17 (delta state stream), the supervisor 20 may read and compare the two streams of delta state packets. The comparison may include transformation and filtering as described in further detail below. If any of the programs are terminated, via exception or normal termination, or if the last breakpoint list was in single-step mode (see step 13), then the DD may terminate. Otherwise, the first delta state that shows a difference corresponds to the function during which the diversion occurred. Such an identified function may be referred to as a CIF, and step 13 may be reiterated. At step 18 (difference stream), differences that go through the filtering in step 17 may be sent to the standard output stream of the supervisor module 20. The result of the DD then goes to the user.

Further with respect to the transformation and filtering of the two delta state streams, the two programs 30, 50 may be considered functionally equivalent even if they have different binary code. In particular, code and data may be structured differently, without affecting their functionality. A typical example is when a function's code is restructured so that frequently executing code is located in close vicinity, thereby achieving better cache performance.

Accordingly, while the branch instructions may be different, as long as the instructions that actually manipulate the input data and thus affect its output are symbolically the same, the original and the modified programs may be considered functionally equivalent. Instructions are symbolically the same when they access the same data, even though the data may reside in different locations, such as, for example, when the data is reordered.

It is noted that because two correct programs can be differ from one another with respect to the content of some variables, such as, for example, the program counter or pointer variables, if the programs are relocated differently. In general, if symbolic information is available, two pointer variables can be added to the state if their symbolic state is taken rather than the binary value.

When considering state packets for comparison, the registers which hold program addresses are preferably compared by their symbolic value of the address rather than their binary value. In order to determine if a register holds an address or some other value (a number or some characters), the following techniques may be used.

Technique 1—if debug information (provided by the compiler as part of the program code) is available, such debug information may be used to find what each register holds. If a given register contains an address of a variable, its binary value may be replaced with the name of the variable.

Technique 2—In the alternative, if the program includes a symbol table, which maps variable names to their addresses, and a register value contains a value in that table, replace the value in the register with the corresponding name.

Technique 3—Consider the case when a register cannot be mapped to a symbol using the above techniques 1 or 2, but the register content points to the code or the data sections. This may be determined from the specification data and code sections in the program, which indicates the start address and size of each section. The following heuristic technique may be used: (a) in the case of a register that holds code address, ignore this value, since it is used as a target of a branch instruction, which may not affect the result of the program (in contrast to data manipulation instructions); and (b) in case of a register that holds a data address, replace it by the offset from the beginning of the data section, which may remove false differences resulting from different placement of the data section.

It is noted that the above transformations may replace address by symbols or position-independent offsets, such that the comparisons done avoid false differences.

In accordance with one aspect of the embodiments described herein, there is a method for locating where a runtime defect occurs in an updated program, comprising: (a) generating a first CFG for an original program, the original program being a predecessor version of the updated program and being free of the runtime defect; and (b) generating a second CFG for the updated program, the first and second CFGs each comprising a plurality of nodes defining a respective tree structure with caller routines in higher hierarchy levels than callee routines.

The method may comprise detecting calls from higher to lower hierarchy levels cycles in the first and second CFGs.

The method may comprise (c) selecting corresponding first and second paths traversing through nodes at a selected hierarchy level of the first and second CFGs, respectively. The method may comprise (d) tracing the first and second paths, comprising the sub-steps of: (1) running the original and updated programs on a computing device comprising a memory and registers; (2) breaking after each traversed node; and (3) determining register states before and after each call to the given traversed node.

The method may comprise (e) comparing the register states for the first and second paths, wherein a difference in the register states indicates that the runtime defect has occurred, comprising the sub-steps of: (1) when the original and updated programs include debug information provided by a compiler and a given register contains an address of a variable, replacing the address with a corresponding name of the variable; and (2) when the original and updated programs include a symbol table that maps variable names to addresses and the given register contains a value in the symbol table, replacing the value with the corresponding name. Step (e) may comprise the sub-step of (3) when the original and updated programs do not include the debug information or the symbol table and the given register holds a data address, replacing the data address by a position-independent offset.

The method may comprise (f) selecting corresponding first and second paths traversing through nodes at a next selected hierarchy level of the first and second CFGs, respectively, the next selected hierarchy level being lower any preceding selected hierarchy levels. The method may comprise (g) repeating steps (d) through (f) until a predefined condition is met, such as, for example, when the difference in the memory register states for the first and second paths occurs. The method may comprise (h) identifying the given traversed node after which the difference in the memory register states for the first and second paths first occurred.

The embodiments described herein may take the form of an entirely hardware embodiment, an entirely software embodiment, or an embodiment containing both hardware and software elements. The invention may be implemented in software, which includes but is not limited to firmware, resident software, microcode, and the like. Furthermore, the embodiments described herein may take the form of a computer program product accessible from a computer-usable or computer-readable medium providing program code for use by or in connection with a computer or any instruction execution system.

For the purposes of this description, a computer-usable or computer readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium may include a semiconductor or solid state memory, magnetic tape, a removable computer diskette, a random access memory (RAM), a read-only memory (ROM), a rigid magnetic disk and an optical disk. Current examples of optical disks may include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) may be coupled to the system either directly or through intervening J/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While the present invention has been illustrated and described with particularity in terms of preferred embodiments, it should be understood that no limitation of the scope of the invention is intended thereby. Features of any of the foregoing methods and devices may be substituted or added into the others, as will be apparent to those of skill in the art. It should also be understood that variations of the particular embodiments described herein incorporating the principles of the present invention will occur to those of ordinary skill in the art and yet be within the scope of the invention.

What is claimed is:

1. A method for locating where a runtime defect occurs in an updated program, comprising:
   (a) generating a first control flow graph (CFG) for an original program, the original program being a predecessor version of the updated program and being free of the runtime defect;
   (b) generating a second CFG for the updated program, the first and second CFGs each comprising a plurality of nodes defining a respective tree structure with caller routines in higher hierarchy levels than callee routines;
   (c) selecting corresponding first and second paths traversing through nodes at a selected hierarchy level of the first and second CFGs, respectively;
   (d) tracing the first and second paths, comprising:
      (1) running the original and updated programs on a computing device comprising of a memory and registers;
      (2) breaking after each traversed node; and
      (3) determining register states before and after each call to the given traversed node;
   (e) comparing the register states for the first and second paths, wherein a difference in the register states indicates that the runtime defect has occurred, comprising:
      (1) when the original and updated programs include debug information provided by a compiler and a given register contains an address of a variable, replacing the address with a corresponding name of the variable;
      (2) when the original and updated programs include a symbol table that maps variable names to addresses and the given register contains a value in the symbol table, replacing the value with the corresponding name; and
      (3) when the original and updated programs do not include the debug information or the symbol table and the given register holds a data address, replacing the data address by a position-independent offset;
   (f) selecting corresponding first and second paths traversing through nodes at a next selected hierarchy level of the first and second CFGs, respectively, the next selected hierarchy level being lower than any preceding selected hierarchy levels; and
   (g) repeating steps (d) through (f) until the difference in the memory register states for the first and second paths occurs.

2. The method of claim 1, further comprising the step of (h) identifying the given traversed node after which the difference in the memory register states for the first and second paths first occurred.

* * * * *